United States Patent
Dantu et al.

(10) Patent No.: US 7,444,151 B2
(45) Date of Patent: *Oct. 28, 2008

(54) METHOD AND SYSTEM FOR PROVIDING SUPPLEMENTARY SERVICES FOR A WIRELESS ACCESS NETWORK

(75) Inventors: Ramanamurthy Dantu, Richardson, TX (US); Shihlung Chiang, Farmers Branch, TX (US); Haochih Paul Yin, Plano, TX (US); Rasik Kachhla, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 11/557,237

(22) Filed: Nov. 7, 2006

(65) Prior Publication Data

US 2007/0066270 A1    Mar. 22, 2007

Related U.S. Application Data

(63) Continuation of application No. 09/907,785, filed on Jul. 18, 2001, now Pat. No. 7,164,913.

(51) Int. Cl.
*H04Q 7/20* (2006.01)
(52) U.S. Cl. .................................. 455/436; 370/331
(58) Field of Classification Search ............... 370/331, 370/353, 354, 355, 356; 455/436, 435.1, 455/432, 435, 422, 426, 437, 438, 439
See application file for complete search history.

(56) References Cited

U.S. PATENT DOCUMENTS

| 6,490,451 | B1 * | 12/2002 | Denman et al. | 455/436 |
| 6,665,537 | B1 | 12/2003 | Lioy | 455/435 |
| 6,879,681 | B2 | 4/2005 | Pedersen et al. | 379/220.01 |
| 7,043,241 | B1 | 5/2006 | Sladek et al. | 455/432.3 |

FOREIGN PATENT DOCUMENTS

WO    WO 02/39304    5/2002

OTHER PUBLICATIONS

M. Handley, et al. "SIP: Session Initiation Protocol," RFC 2543, IETF, Mar. 1999.
S. Donovan and M. Cannon., "The SIP INFO method," IETF Draft, Jun. 1999.
A. Vemuri and J. Peterson, "SIP for Telephones (SIP-T): Context and Architectures," IETF Draft, Jul. 14, 2000.
M. Handley and V. Jacobson, "SDP: Session Description Protocol", RFC 2327, Apr. 1998.
N. Freed and N. Borenstein, "Multipurpose Internet Mail Extensions (MIME) Part One: Format of Internet of Message Bodies," RFC2045, Nov. 1996.

(Continued)

*Primary Examiner*—Olisa Anwah
(74) *Attorney, Agent, or Firm*—Baker Botts L.L.P.

(57) ABSTRACT

A method and system for providing supplementary services for a wireless access network includes downloading supplementary service triggers from a call agent to a mobility control function (MCF) for a wireless access network. Wireless-specific signaling of the wireless access network is communicated to the MCF. The MCF detects events associated with a trigger based on the wireless-specific signaling. The call agent is informed of the events by the MCF through session initiating protocol (SIP) extensions.

27 Claims, 16 Drawing Sheets

OTHER PUBLICATIONS

Eric Zimmerer, et al., "MIME media types for ISUP and QSIG Objects," IETF Draft, Oct. 2000.

"Switching and Signalling Specifications of Signalling System No. 7—ISDN User Part," ITU-T Q.763, Sep. 1997.

"3GPP Call Forwarding (CF) supplementary services," 3G TS 24.082, V3.0.0, May 1999.

"3GPP Call Waiting (CW) and Call Hold (HOLD) supplementary services," 3G TS 24.083 V3.0.0, May 1999.

Steve Jones, Mike Dolan, *SP-4377 Base Part (to be published as TIA/EIA-634.000-C) Baseline Text Version*, TIA/EIA-634.000, Dec. 3, 1998.

*3rd Generation Partnership Project; Technical Specification Group Radio Access Network; UTRAN Iu interface RANAP signalling (Release 4)*, 3GPP TS 25.413, Jun. 2003.

*Cellular Radiotelecommunications Intersystem Operations*, TIA/EIA Standard, ANSI/TIA/EIA-41-D-1997, Dec. 1997.

N. Freed, N. Borestein, "Multipurpose Internet Mail Extensions (MIME) Part Two: Media Type", RFC2046, Nov. 1996.

A. Vaha-Sipila, "URLs for Telephone Calls", RFC 2806Bis, Oct. 26, 2000.

\* cited by examiner

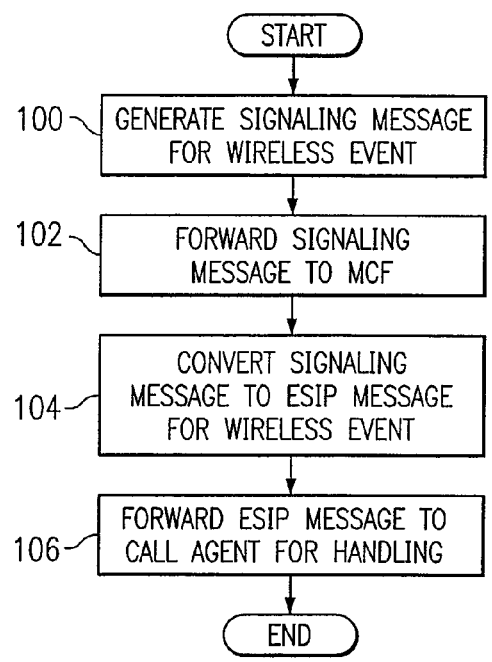
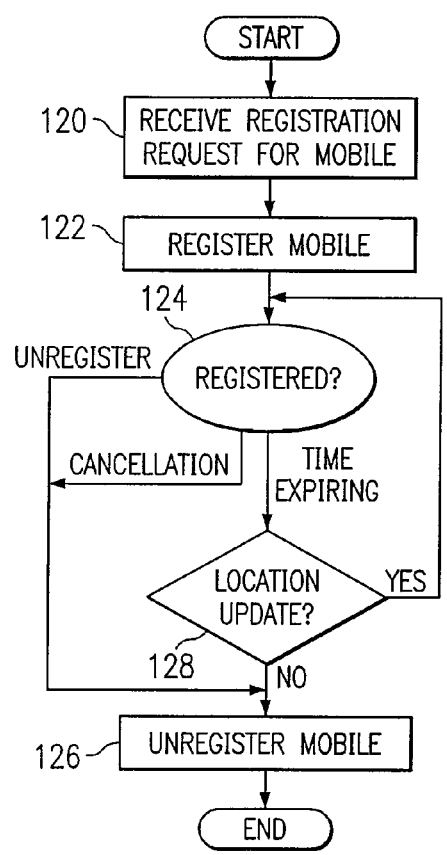
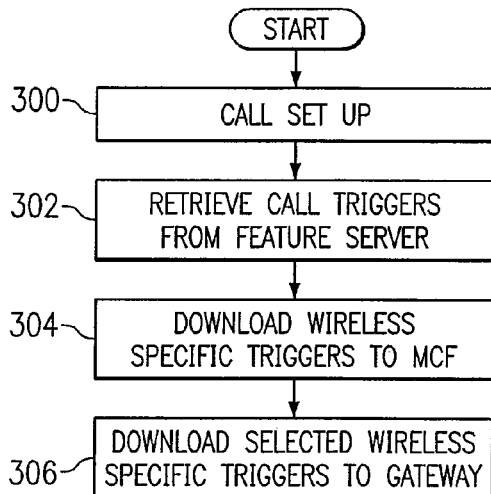
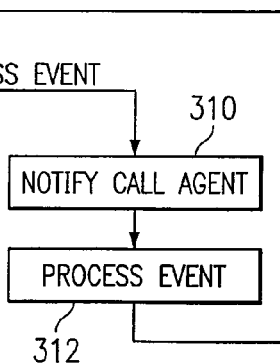
FIG. 2
FIG. 3
FIG. 10

FIG. 4
SIP MESSAGES FOR BASIC SERVICES AND MOBILITY MANAGEMENT

| MCF/CA INTERFACE EVENT | MCF/CA INTERFACE | SIP REQ/RESP | SIP HEADERS/ PARAMETERS | EVT (OPN) | SIP EXTENSION PARAMETERS | NOTES |
|---|---|---|---|---|---|---|
| 140 — MOBILE REGISTRATION (LOCATIONUPDATEREQ) | IS-634 | REGISTER | FROM:MIN EXPIRE:x | NONE | ESN, CELLID | REGNOT SENT TO VLR/HLR FOR INITIAL REGISTRATION |
| 142 — MOBILE UNREGISTERS | IS-634 | REGISTER | FROM:MIN EXPIRE:0 | NONE | ESN | REGCANC SENT TO VLR/HLR |
| 144 — LOCATIONUPDATEREQ (LUR) | IS-634 | REGISTER | FROM:MIN | LOCATIONUPDATINGREQ | ESN, CELLID | SUBSEQUENT LOCATION UPDATES |
| 146 — REGISTRATION CANCELLATION FROM HLR/VLR | IS-41 | REGISTER | TO:MIN EXPIRE:0 | NONE | ESN | REGN CANCELLATION RECEIVED BY CA WHEN MS MOVES TO ANOTHER SERVING MSC |

FIG. 6

SIP MESSAGES FOR BASIC CALL HANDLING

| MCF/CA INTERFACE EVENT | MCF/CA INTERFACE | SIP REQ/RESP | SIP HEADERS/ PARAMETERS | EVT (OPN) | SIP EXTENSION PARAMETERS | NOTES |
|---|---|---|---|---|---|---|
| ROUTEREQ FROM HLR | IS-41 | INFO | TO:MIN | ASSIGNTLDN | NONE | CA RECEIVES ROUTEREQ FROM HLR AND NEEDS TO ASSIGN A TLDN FOR AN ONNET MS |
| RESPONSE TO SIP INFORMATION | | 200 OK | FROM:MIN | ASSIGNTLDN | TLDN | MCF ASSIGNS THE TLDN AND NOTIFIES THE CA WITH THE MIN TO TLDN ASSOCIATION |
| TLDN TIMER EXPIRY | INTERNAL | INFO | FROM:MIN | DEASSIGNTLDN | TLDN | TLDN TIMER EXPIRED. TLDN IS RELEASED AND MIN NO LONGER ASSOCIATED TO TLDN. THE TLDN IS ALSO RELEASED WHEN THE CALL ARRIVES AT CA/MCF |

200 — (row 1)
202 — (row 2)
204 — (row 3)

FIG. 8a

SIP MESSAGES FOR PACKET NETWORK TO LEGACY SYSTEM HANDOFF

| | MCF/CA INTERFACE EVENT | MCF/CA INTERFACE | SIP REQ/RESP | SIP HEADERS/ PARAMETERS | EVT (OPN) | SIP EXTENSION PARAMETERS | NOTES |
|---|---|---|---|---|---|---|---|
| 280 | HANDOFF REQUIRED FROM MS FOR HANDOFF TO LEGACY NETWORK | IS-634 | NONE | NONE | NONE | NONE | MCF SENDS A FACILITIES DIRECTIVE2 REQUEST OVER IS-41 I/F WITH TARGET CELLID, MIN, ESN NUMBER AND HANDOFF CKT ID TO SETUP INTERSYSTEM TRUNK FOR HANDOFF TO LEGACY NETWORK AND START INTER-SYSTEM HANDOFF |
| 282 | FACILITIESDIRECTIVE2 RESPONSE FROM TARGET MSC | IS-41 | NONE | NONE | NONE | NONE | RESPONSE FROM TARGET MSC AFTER IT INITIATES HANDOFF |
| 284 | MOBILEONCHANNEL RECEIVED BY MCF | IS-41 | NONE | NONE | NONE | NONE | SENT BY TARGET (LEGACY) MSC AFTER COMPLETION OF HANDOFF TO LEGACY NETWORK |
| 286 | REGCAN FROM HLR RECEIVED BY CA | IS-41 | REGISTER | TO:MIN EXPIRE:0 | NONE | NONE | AFTER COMPLETION OF HAND OFF TO LEGACY NETWORK THE MS GETS REGISTERED AT ANOTHER SERVING MSC. NOTE CALL STILL REMAINS ACTIVE |
| 288 | FACILITIESRELEASE RECEIVED BY MCF | IS-41 | BYE | FROM:MIN | NONE | NONE | IF THE MCF WAS THE ANCHOR MSC, FACILITIESRELEASE IS RECEIVED FROM THE SERVING MSC. THE HANDOFF CIRCUIT ON THE HANDOFF GATEWAY IS ALSO RELEASED AND CA IS NOTIFIED TO RELEASE THE CALL |

FIG. 8b

SIP MESSAGES FOR LEGACY SYSTEM TO PACKET NETWORK HANDOFF

| MCF/CA INTERFACE EVENT | MCF/CA INTERFACE | SIP REQ/RESP | SIP HEADERS/ PARAMETERS | EVT (OPN) | SIP EXTENSION PARAMETERS | NOTES |
|---|---|---|---|---|---|---|
| FACILITIESDIRECTIVE2 REQUEST FROM LEGACY MSC | IS-41 | NONE | NONE | NONE | NONE | SERVING LEGACY MSC SENDS A REQUEST (WITH ESN, TARGETCELLID, HANDOFF CKT ID ETC) OVER IS-41 I/F TO MCF TO SETUP THE TARGET BSC. MCF SENDS HANDOFF REQUEST TO TARGET BSC TO ALLOCATE RESOURCES |
| FACILITIESDIRECTIVE2 RESPONSE TO LEGACY MSC | IS-41 | REGISTER | TO:MIN | NONE | ESN, CELLID INFORMATION | WHEN A MS MOVES INTO THE PACKET NETWORK AREA, THE MS NEEDS TO BE REGISTERED IN THE MCF. MCF ALSO REGISTERS THE MS WITH THE HLR USING REGISTRATION NOTIFICATION REQUEST |
| HANDOFF COMPLETE | IS-634 | NONE | NONE | NONE | NONE | AFTER COMPLETION OF HANDOFF TO PACKET NETWORK, I.E WHEN MS CAN SUCCESSFULLY BE ACCESSED BY BSC IN THE PACKET NETWORK, MCF WILL SEND MOBILEONCHANNEL TO THE CURRENT SERVING MSC. MCF THEN SENDS MOBILEONCHANNEL TO THE SERVING MSC. MCF ALSO SENDS REGNOT TO REGISTER THIS MS WITH HLR. WHEN REGNOT RESPONSE RECEIVED, CA IS NOTIFIED VIA SIP REGISTER MESSAGE WITH PROFILE INFORMATION |

290, 292, 294

FIG. 11a
SIP MESSAGES FOR FEATURE ACTIVATION/DE-ACTIVATION

| MCF/CA INTERFACE EVENT | MCF/CA INTERFACE | SIP REQ/RESP | SIP HEADERS/ PARAMETERS | EVT (OPN) | SIP EXTENSION PARAMETERS | NOTES |
|---|---|---|---|---|---|---|
| CM SERVICE REQUEST | IS-634 | INVITE | TO:FEATURE CODE FROM:MIN | NONE | NONE | CA NOTIFIES HLR VIA FEATREQ MSG |
| FEATUREREQ RESPONSE FROM HLR | IS-41 | 200 OK 4xx | TO:MIN | NONE | TREATMENT CODE: CONFIRMATIONTONE OR ANNOUNCEMENT | MCF APPLIES THE TREATMENT BASED ON TREATMENT CODE AND RELEASES THE CALL. MCF WILL REQUEST IAG TO APPLY CONFIRMATION TONE BASED ON THE SIP RESPONSE |

320 — row 1
322 — row 2

FIG. 11b
SIP MESSAGES FOR ABBREVIATED DIALING

| MCF/CA INTERFACE EVENT | MCF/CA INTERFACE | SIP REQ/RESP | SIP HEADERS/ PARAMETERS | EVT (OPN) | SIP EXTENSION PARAMETERS | NOTES |
|---|---|---|---|---|---|---|
| CM SERVICE REQUEST | IS-634 | INVITE | TO:DIALED DIGITS FROM:MIN | NONE | NONE | |

324

FIG. 11c
SIP MESSAGES FOR CALLING NUMBER IDENTIFICATION PRESENTATION/RESTRICTION (CNIP/CNIR)

| MCF/CA INTERFACE EVENT | MCF/CA INTERFACE | SIP REQ/RESP | SIP HEADERS/ PARAMETERS | EVT (OPN) | SIP EXTENSION PARAMETERS | NOTES |
|---|---|---|---|---|---|---|
| CM SERVICE REQUEST | IS-634 | INVITE | TO:CALLEDNUMBER FROM:MIN | NONE | NONE | CALL AGENT FORMATS THE CALLING NUMBER IN ISUP IAM MSG FROM CALLS TO PSTN ON LEGACY MSC USING FROM DATA AND USER PROFILES BASED ON CNIR FEATURE OF THE MS'S PROFILE |
| ISUP IAM | PSTN/MSC I/F | INVITE | TO:MIN FROM: | NONE | NONE | CALL AGENT WILL INCLUDE THE FROM FIELD DATA IF THERE IS NO RESTRICTION ON PRESENTATION. ALTERNATIVELY A STRING OF UNKNOWN OR ANONYMOUS |

326 — first row
328 — second row

FIG. 11d
SIP MESSAGES FOR CALL FORWARDING UNCONDITIONAL (CFU)

| MCF/CA INTERFACE EVENT | MCF/CA INTERFACE | SIP REQ/RESP | SIP HEADERS/ PARAMETERS | EVT (OPN) | SIP EXTENSION PARAMETERS | NOTES |
|---|---|---|---|---|---|---|
| INFODIR FROM HLR TO CA | IS-41 | INFO | TO:MIN | CFU | TREATMENT CODE | MCF APPLIES THE A SINGLE ABBREVIATED ALERT TONE TO MS VIA PDSN BASED ON ALERT CODE |
| FLASH WITH INFO ACK FROM MS | IS-634 | 1xx 200 OK | FROM:MIN | NONE | NONE | RESPONSE SENT TO CA |

330 — first row
332 — second row

FIG. 11e
SIP MESSAGES FOR CALL FORWARDING NO ANSWER (CFNA)

| MCF/CA INTERFACE EVENT | MCF/CA INTERFACE | SIP REQ/RESP | SIP HEADERS/ PARAMETERS | EVT (OPN) | SIP EXTENSION PARAMETERS | NOTES |
|---|---|---|---|---|---|---|
| PAGE OR ANSWER TIMEOUT | IS-634 | 408 REQUEST TIMEOUT | TO:CLDNO. FROM:MIN | NONE | NONE | |

334

FIG. 11f
SIP MESSAGES FOR CALL WAITING

| MCF/CA INTERFACE EVENT | MCF/CA INTERFACE | SIP REQ/RESP | SIP HEADERS/ PARAMETERS | EVT (OPN) | SIP EXTENSION PARAMETERS | NOTES |
|---|---|---|---|---|---|---|
| ISUP IAM | HOME MSC | INVITE | TO:MIN FROM:CLGNO | NONE | NONE | SECOND CALL REQUEST TO MS. MCF SENDS FLASHWITHINFORMATION |
| FLASHWITHINFORMATION (INITIAL RESPONSE) OR TIMEOUT | IS-634 | 200 / 406 NOT ACCEPTED | TO:CLGNO FROM:MIN AS ABOVE | NONE | NONE | IF MS ACCEPTS SECOND CALL THE FIRST TIME MS DOES NOT ACCEPT SECOND CALL |
| FLASHWITHINFORMATION (SUBSEQUENTLY) | IS-634 | INFO | TO:CLGNNO FROM:MIN | FLASH | NONE | SUBSEQUENTLY WHEN MS SWITCHES TO OTHER CALL LEG |

SIP MESSAGES FOR VOICE MAIL WAITING NOTIFICATION

| MCF/CA INTERFACE EVENT | MCF/CA INTERFACE | SIP REQ/RESP | SIP HEADERS/ PARAMETERS | EVT (OPN) | SIP EXTENSION PARAMETERS | NOTES |
|---|---|---|---|---|---|---|
| QUALDIR REQUEST FROM HLR | IS-41 | INFO | TO:MIN | NOTIFY | MSGWAITNOTIFICATIONCOUNT MSGWAITNOTIFICATIONTYPE | HLR NOTIFIES CA VIA QUALIFICATIONDIRECTIVE WITH MSGWAITNOTIFICATIONCOUNT AND MSGWAITNOTIFICATIONTYPE. CA WILL FORWARD THE NOTIFICATION USING INFO MSG WITH MSG WAITING INDICATION PARAMETER TO MCF. IF MS IS REGISTERED OTHERWISE WAITS FOR THE MS TO REGISTER |
| QUALDIR RESP TO HLR FROM CA | IS-41 | 200 OK 4xx | FROM:MIN | NONE | NONE | MCF RESPONSE TO CA FOR MSGWAITINGNOTIFICATION AND CA RESPONDS TO HLR |

342 — QUALDIR REQUEST FROM HLR
344 — QUALDIR RESP TO HLR FROM CA

FIG. 11h

SIP MESSAGES FOR VOICE MESSAGE RETRIEVAL

| MCF/CA INTERFACE EVENT | MCF/CA INTERFACE | SIP REQ/RESP | SIP HEADERS/ PARAMETERS | EVT (OPN) | SIP EXTENSION PARAMETERS | NOTES |
|---|---|---|---|---|---|---|
| 346 — CM_SERVICE_REQUEST FROM MS | IS-634 | INVITE | TO:MIN FROM:MIN | NONE | NONE | CA DETECTS REVERTIVE CALL WHEN MS DIALS IT'S OWN NUMBER. CA SENDS LOCREQ TO HLR IF VOICE MESSAGE SERVER IS NOT CONFIGURED ON THE CA |
| 348 — LOCATIONREQUEST RESPONSE FROM HLR | IS-41 | 1xx 200 OK | TO:MIN | NONE | NONE | LOCATION REQUEST RESPONSE CONTAINS THE TERMLIST PARAMETERS WHICH WILL CONTAIN THE DESTINATION DIGITS OF THE VOICE MAIL SERVER. CA PERFORMS ROUTING TO THE VOICE MAIL SERVER AND SETS UP THE CONNECTION TO VOICE MAIL SERVER. MCF HANDLES THE RESPONSE FROM CA AND SETS UP THE BEARER PATH |

FIG. 11i

SIP MESSAGES FOR CALLING NAME PRESENTATION AND RESTRICTION (CNAP AND CNAR)

| MCF/CA INTERFACE EVENT | MCF/CA INTERFACE | SIP REQ/RESP | SIP HEADERS/ PARAMETERS | EVT (OPN) | SIP EXTENSION PARAMETERS | NOTES |
|---|---|---|---|---|---|---|
| 350 — ISUP IAM | PSTN/MSC I/F | INVITE | TO:MIN | NONE | CGNAME | CA INCLUDES THE CALLING NAME IN THE EXTENSION PARAMETERS |

METHOD AND SYSTEM FOR PROVIDING SUPPLEMENTARY SERVICES FOR A WIRELESS ACCESS NETWORK

RELATED PATENT APPLICATIONS

This application is a continuation of U.S. application Ser. No. 09/907,785 filed Jul. 18, 2001 and entitled "Method and System for Providing Supplementary Services for a Wireless Access Network".

This application is related to U.S. patent application Ser. No. 09/907,626 filed Jul. 18, 2001 entitled "Method And System of Control Signaling For A Wireless Access Network," and U.S. patent application Ser. No. 09/908,081 filed Jul. 18, 2001 entitled "Method and System for Providing Wireless-Specific Services for a Wireless Access Network," now U.S. Pat. No. 7,058,033 issued Jun. 6, 2006.

TECHNICAL FIELD OF THE INVENTION

This invention relates generally to the field of wireless communications, and more particularly to a method and system for providing supplementary services for a wireless access network.

BACKGROUND OF THE INVENTION

Traditional wireless networks include a number of base transceiver stations (BTSs) and one or more mobile switching centers (MSCs) and base station controllers (BSCs). The BTSs each cover a geographic region, or cell of the wireless network and communicate with mobile telephones in the cell. The MSCs/BSCs provide switch and soft handoff functionality for the wireless network.

To support mobility and supplementary services within and across wireless access networks, wireless-specific interfaces such as IS-41 are used to communicate with a network control plane. Integration of such wireless specific interfaces into call agents or servers of the control plane for signaling between the control plane and the access network is problematic because the call agent/servers typically utilize session initiation protocol (SIP) for signaling and standardized SIP does not support wireless-specific functionality.

SUMMARY OF THE INVENTION

The present invention provides a method and system for providing supplementary services for a wireless access network that substantially eliminate or reduce the problems and disadvantages associated with previous methods and systems. In a particular embodiment, mobility control functions (MCF) are integrated or interfaced to a call agent or call server and session initiation protocol (SIP) extensions are used to communicate between the MCF and the call agent to support supplementary services for mobile devices in the wireless access network.

In accordance with one embodiment of the present invention, a method and system for providing supplementary services for a wireless access network include downloading supplementary service triggers from a call agent to a MCF for the wireless access network. Wireless-specific signaling for the wireless access network is communicated to the MCF. An event associated with a trigger is determined at the MCF based on the wireless-specific signaling. The call agent is informed of the event by the MCF by the MCF through SIP extensions.

More specifically, in accordance with a particular embodiment of the present invention, the SIP extension may be processed at the call agent to provide an associated supplementary service for the call. The supplementary service triggers may also be downloaded to a bearer traffic gateway for the call. In this embodiment, events associated with a trigger may also be detected in the bearer traffic gateway and forwarded to the MCF for processing.

Technical advantages of the present invention include providing an improved method and system for supporting supplementary services for a wireless access network. In particular, triggers for voice as well as other wireless Internet calls are handled by a call agent that communicates with the wireless access network through a MCF. The MCF may receive service profile information and triggers during registration and/or call origination. Events associated with the triggers may be detected in the MCF and/or air or bearer gateway. After detecting an event, the MCF informs a call agent through the SIP extensions. The call agent processes the SIP extension to provide an associated supplementary service for the call.

The various embodiments of the present invention may include all, some or none of the enumerated advantages. Furthermore, other advantages of the present invention may be readily apparent to one skilled in the art from the following figures, descriptions and claims.

BRIEF DESCRIPTION OF THE DRAWINGS

For a more complete understanding of the present invention and its advantages, reference is now made to the following description, taken in conjunction with the accompanying drawings, wherein like numerals represent like parts, in which:

FIG. 2 is a flow diagram illustrating a method for wireless-specific control signaling in the communication network of FIG. 1 in accordance with one embodiment of the present invention;

FIG. 3 is a flow diagram illustrating a method for mobile device registration in the communication network of FIG. 1 in accordance with one embodiment of the present invention;

FIG. 4 is a table illustrating session initiation protocol (SIP) messages for basic services and mobility management for mobile devices in the communication network of FIG. 1 in accordance with one embodiment of the present invention;

FIG. 6 is a table illustrating SIP messages for basic call handling for mobile devices in the communication network of FIG. 1 in accordance with one embodiment of the present invention;

FIGS. 8A-B are tables illustrating SIP messages for handoffs between the legacy systems and packet networks for mobile devices in the communication network of FIG. 1 in accordance with one embodiment of the present invention;

FIG. 10 is a flow diagram illustrating a method for providing supplementary services for wireless calls in the communication network of FIG. 1 in accordance with one embodiment of the present invention;

FIGS. 11A-I are tables illustrating SIP messages for providing supplementary services for wireless calls in the communication network of FIG. 1 in accordance with one embodiment of the present invention.

DETAILED DESCRIPTION OF THE INVENTION

Figure 1:
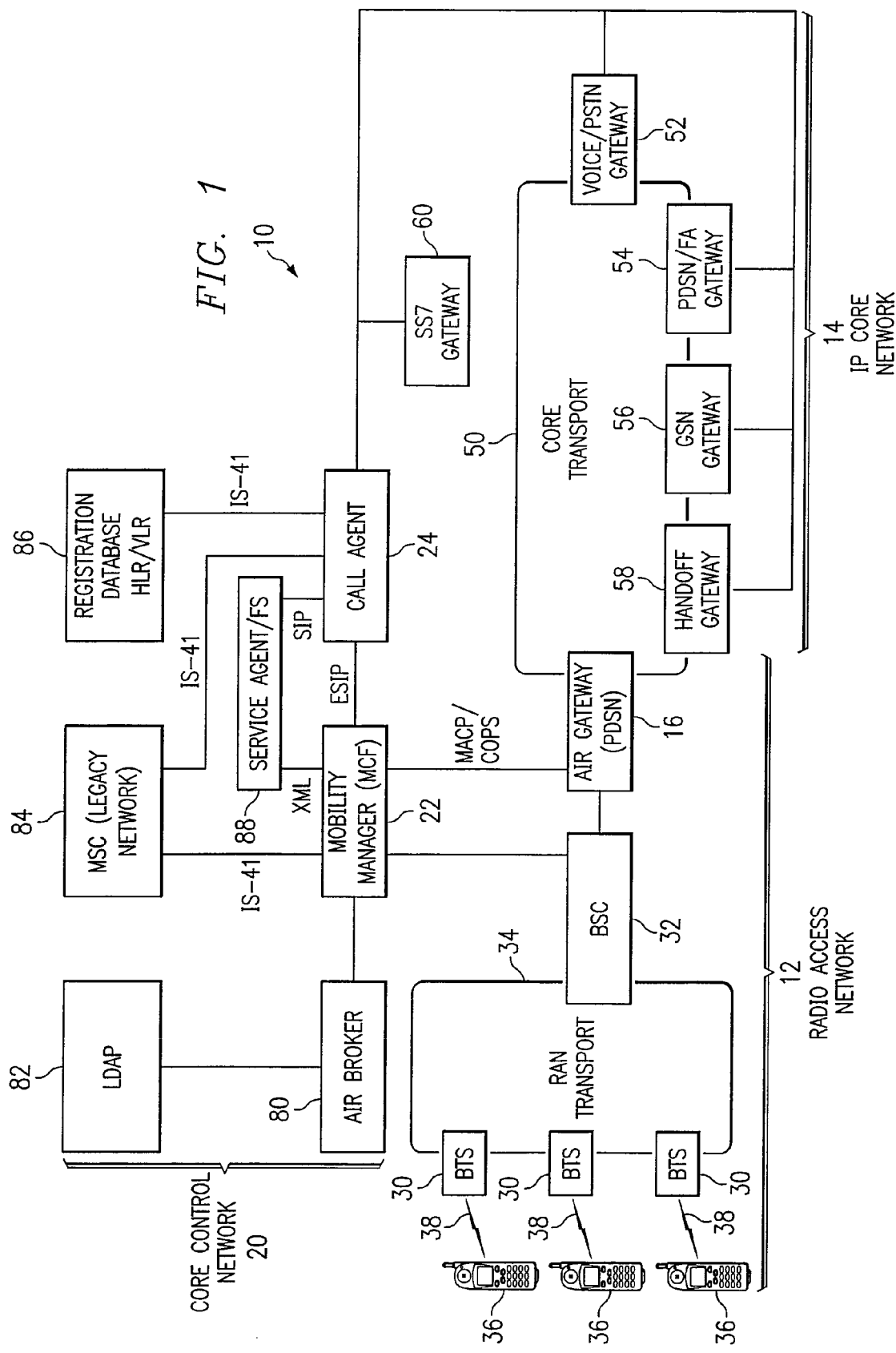
FIG. 1 is a block diagram illustrating an integrated wireline and wireless communication network in accordance with one embodiment of the present invention.

FIG. 1 illustrates a communication network 10 in accordance with one embodiment of the present invention. In this embodiment, the communication network 10 includes a cellular wireless network in which terrestrial wireless transmissions originate in geographically delimited cells. It will be understood that the present invention may be used in connection with satellite and other suitable wireless networks.

Referring to FIG. 1, the communication network 10 includes a wireless network 12 connected to a wireline network 14 through an air gateway 16 that separates signaling and bearer traffic and converts traffic between wireless and wireline formats. The air gateway may comprise a packet data serving node (PDSN) for CDMA or CDMA 2000 or comprise a signaling gateway server node (SGSN) for universal mobile telecommunications system (UMTS) or other suitable node. In the CDMA embodiment, the PDSN 16 may have a router that directs traffic in the bearer plane between the wireless and wireline networks 12 and 14. In one embodiment, the PDSN 16 includes a data interworking function (IWF) that provides connectivity between the wireless and the wireline networks 12 and 14 via circuit switched and packet switched wireless data protocols. It will be understood that connectivity between the wireless and wireline networks 12 and 14 may be otherwise suitably provided without departing from the scope of the present invention.

The wireless and wireline networks 12 and 14 are managed by a service/control layer 20. In one embodiment, the wireless network 12 comprises a radio access network (RAN), the wireline network 14 comprises an Internet protocol (IP) core network 14 and the service/control layer 20 comprises a core control network 20. In this embodiment, the RAN 12 is coupled to the core control network 20 through a mobility control function (MSF), air agent or other suitable mobility manager 22. The IP core network 14 is coupled to the core control network 20 through the MCF 22 and a call agent 24. The MCF 22 may, in one embodiment, be integrated into the call agent 24.

As described in more detail below, the call agent 24 provides for home base control of basic call and feature interaction. The call agent 24 is also responsible for handling call roaming between different networks while wireless mobility during a call is handled by the MCF 22. In one embodiment, the MCF 22 provides the call agent 24 with handoff addresses and the call agent 24 communicates with the IP core network 14 to change call circuits for handoffs. The MCF 22, call agent 24 and other element of the communication network 10 may perform a task by themselves taking a specified action, initiating the action and/or directing another element to take the action.

The MCF 22 and the call agent 24 communicate signaling messages over an extended session initiated protocol (SIP) or other native interface, or format of the call agent 24. Accordingly, the call agent 24 may handle wireless-specific events of the RAN 12 without wireless-specific interfaces to the MCF 22. The native interface of the call agent 24 may comprise any suitable interface utilized by the call agent 24 for processing control, management or other signaling messages for one or more of an IP, DSL and/or other wireline network 14. In one embodiment, the native interface of the call agent 24 is a common interface used by the call agent 24 to process signaling messages for substantially all or all connected wireline, wireless and other networks.

The RAN 12 includes a number of base transceiver stations (BTSs) 30 connected to base station controllers (BCSs) 32 over a RAN transport ring or network 34. The BTSs 30 each cover a geographic region, or cell of the RAN 12 and communicate with mobile devices 36 in the cell. As used herein, each means every one of at least a subset of the identified items. The mobile devices 36 may be cell phones, data phones, portable data devices, portable computers, hand-held devices, hand sets, portable network appliances or other suitable devices or stations capable of communicating information over a wireless link 38.

The BSCs 32 are connected to each other, to the PDSN 16 and to the MCF 22 of the core control network 20. The BSCs 32 and the MCF 22 provide switch and soft handoff functionality for the RAN 12. In this way, voice, video, data and other information is routed to and from the mobile devices 36 and connections are maintained with the mobile devices 36 as they move throughout the RAN 12 and between the RAN 12 and other legacy systems and/or packet networks.

The wireless link 38 is a radio frequency (RF) link. The wireless link 38 may be based on established technologies or standards such as IS-54 (TDMA), IS-95 (CDMA), GSM and AMTS, 802.11 base LAN, or more recent technology such as CDMA 2000 and W-CDMA or proprietary radio interfaces. In a particular embodiment, wireless link 38 comprises a code division multiple access (CDMA) link based on a CDMA standard and in which packets are segmented into radio frames for transmission over the wireless interface and reassembled by the receiving device to reconstitute the packets.

The IP core network 14 includes a packet-switched or other suitable core transport network 50 connecting a number of routers, servers and/or gateways to each other, to the PDSN 16 and thus the RAN 12 as well as the core control network 20. In a particular embodiment, the core transport network 50 connects the PDSN 16, and thus the RAN 12 to the public switch telephone network (PSTN) through a voice/PSTN gateway 52. The core transport network 50 may also connect the PDSN 16 and RAN 12 to a remotely located PDSN through a PDSN/foreign agent (FA) gateway 54, to global system for mobile communications (GSN) through GSN gateway 56 and to a handoff gateway 58. The PDSN/FA gateway 54 provides a data gateway for CDMA 2000. The GSN gateway 56 provides a data gateway. The handoff gateway 58 provides a gateway for voice traffic. It will be understood that the core transport network 50 may connect the PDSN 16 and RAN 12 to other suitable gateways, such as a wireless access protocol (WAP) gateway for a home agent corporate virtual private network (VPN). The gateways 52, 54, 56 and 58 along with a control plane signaling system 7 (SS7) gateway 60 are managed by the call agent 24 of the core control network 20.

The handoff gateway 58 interfaces to the legacy MSC/BSC network. In a particular embodiment, DS0/DS1 circuits are used for interfacing the legacy networks and the circuits are added and deleted during handoff from packet network to legacy system. In operation, the handoff gateway 58 provides a point of attachment for calls across networks. A call may be any suitable connection or set of connections in which video, audio, voice, data or other information is exchanged. It will be understood that functionality of the handoff gateway 58 may be implemented in the voice/PSTN gateway 52 or otherwise suitably implemented.

The core control network 20 includes the MCF 22 and the call agent 24, as well as an air broker 80, lightweight director access protocols (LDAP) 82, legacy MSC 84, home location register (HLR)/visitor location register (VLR) or other suitable registration database 86 and service agent/feature server (FS) 88. In a particular embodiment, the MCF 22 may communicate with the RAN 12 and the legacy MSC using IS-41 or other wireless-specific interface. A wireless-specific interface is an interface or protocol especially adapted for radio frequency or mobile traffic or signaling and not typically used by wireline networks 14. The PDSN 16 may communicate with the MCF 22 using media gateway control protocol (MGCP)/common open policy server (COPS). The MCF 22 may communicate with the FS 88 using markup language (XML). The call agent may communicate with the FS 88 using SIP and may communicate with the HLR/VLR 86 and the legacy MSC using IS-41-D. It will be understood that the RAN 12, IP core network 14 and core control network 20 may communicate internally and with each other using other suitable interfaces, protocols and formats. It will be further understood that call agent 24, MCF 22 as well as other elements in the core control network 20 and/or radio access and IP core networks 12 and 14 may otherwise communicate with each other. For example, the call agent 24 may directly communicate with and control the air gateway and/or PDSN 16. Similarly, the MCF 22 may directly communicate and/or interface with the HLR/VLR 86.

The MCF 22 provides a wireless access interface for the RAN 12 and support wireless-specific and mobility functions of the RAN 12. In a particular embodiment, the MCF 22 provides temporary line directory number (TLDN) management and innerworks with the call agent 24 to assign TLDN for incoming mobile calls. The MCF 22 may manage all types of handoffs and may interface with the handoff gateway 58 for inner system handoffs. The MCF 22 may also support a vocoder and may anchor the bearer traffic path at the PDSN 16, except in cases where the mobile subscriber is roaming off net. A mobile subscriber is roaming off net when it is roaming and registered in another packet network or a legacy system. A packet network is a network where the data and control plane are IP based or packet switched. The legacy system comprises BTSs, BSCs. and MSCs. A mobile subscriber is roaming on net when it is registered and active in the packet network managed by the MCF 22.

The call agent 24 may be a generic and/or shared call agent operable to manage call establishment for a plurality of network types, such as DSL, cable and wireless. The generic call agent 24 need not have wireless-specific interfaces to communicate with the RAN 12. In one embodiment, the call agent 24 provides call control and supplementary services using internal or external FS 88. The call agent 24 may also provide management and mobility support in connection with the MCF 22 and provide a call signaling anchor. Additionally, the call agent 24 may provide other services such as message waiting notification, message retrieval, short message service and the like. The call agent 24 interfaces with the legacy MSC 84 as well as PSTN via the PSTN gateway 52. The call agent 24 may have an ISDN user port (ISUP)/SS7 signal interface to the gateways 52, 54, 56 and 58.

Other functions of the call agent 24 may include feature code update and acknowledgment provided to mobile devices 36 that are on net, call retrieval to access voice mail service, call terminations to mobile subscribers homed in the legacy MSC 84. For retrieved calls, the call agent 24 may provide a retrieve trigger point or detect during digit analysis. For outgoing call originations from the packet network to other mobile subscribers, the call agent 24 may determine after a digit analysis that the number called is another mobile subscriber by using a block of mobile subscribers registered on the network that can be queried to determine if the number is a mobile subscriber or a PSTN call. The call agent 24 may additionally innerwork with the MCF 22 when a TLDN is assigned for call terminations to on net mobile subscribers in the packet network. The call agent 24 may further notify the MCF 22 when a TLDN expires to allow the MCF 22 to free up the TLDN.

To support wireless-specific functionality, the MCF 22 and call agent 24 communicate using extended SIP or other suitable protocol native to the call agent 24. In a particular embodiment, the MCF 22 may comprise an A interface input port for communicating with the RAN 12, A translator for translating A interface formatted messages to extended SIP formatted messages and an extended SIP interface for communicating with the call agent 24. In this embodiment, the call agent 24 may include an extended SIP interface for communicating with the MCF 22 and an IS-41-D interface for communicating with the legacy network 84 and HLR/VLR 86. It will be understood that the MCF 22 and call agent 24 may comprise other suitable functionality without departing from the scope of the present invention.

In the SIP embodiment, core SIP defined by RFC 2543 is used for basic call setup. SIP extensions are used to carry wireless-specific parameters and also used support the transport of mid-call and call independent signaling as well as to register or de-register new subscribers. The SIP extensions may be negotiated during call set up. In a particular embodiment the multipart multipurpose Internet mail extension (MIME) with multipart/mixed media type is used to allow the SIP body to contain multiple payloads. The single-part MIME is also used when only one MCAP payload is needed in the SIP message. The MCAP payload is case intensive, text-based data in an event name followed by parameters format. The format and number of mandatory parameters depend on the event name. The SIP:INFO method with MCAP payload is used to support mid-call signaling and call independent signaling. Standard SIP register requests are extended to carry the MCAP payload containing extended register parameters to support mobile registration.

The interface for the SIP extensions may comprise a SIP request or response identifier, followed by SIP headers/parameters, followed by content-type: application/application type, followed by content-length:xx, followed by carriage return line feed (CRLF) followed by the message body with the requested event or notification. Events and notifications may be optional and only used if the SIP request or response has not itself determined the event that occurred.

The MCF 22, call agent 24, and other nodes and/or elements of the core control network 20, RAN 12 and IP core network 14 may be implemented as functional instructions, code or other logic encoded in media. The logic encoded in media may comprise software stored on a computer-readable medium as well as programmed application-specific integrated circuit (ASIC), field programmable gate array (FPGA) or other programmed hardware. The media may comprise different mediums and may be distributed across a plurality of platforms.

FIG. 2 is a flow diagram illustrating a method for wireless-specific control signaling in a communication network 10 in accordance with one embodiment of the present invention. In this embodiment, control signaling is received in the core control network by the MCF 22, converted to extended SIP and forwarded to the common, or generic call agent 24 for processing. Thus, the MCF may be a SIP client and/or SIP proxy. It will be understood that if the control signaling is received in an extended SIP format, it need not be translated by the MCF 22 but may be passed directly to the call agent 24 for processing.

Referring to FIG. 2, the method begins at step 100 in which the mobile device 36 generates a signaling message for a wireless event in the A interface, IS-41, IS-634 for CDMA, RAN application port (RANAP (UMTS)) or other wireless-specific format. Next, at step 102, the mobile device 36 forwards the signaling message to the MCF 22 through the RAN transport network 34 and the BSC 32. In the IS-41 embodiment, the signaling message may be received at an IS-41 port of the MCF 22.

Proceeding to step 104, the MCF 22 converts the signaling message from the wireless-specific format to a call agent message in the SIP format. The MCF 22 may convert the message by translating the message or by otherwise suitably generating a new message based on the signaling message. The conversion may comprise interworking or tunneling for carrying the wireless-specific information into the SIP domain. For tunneling, session description protocol (SDP) may be enhanced and utilized. The SIP message may incorporate location or other wireless event information from the message or information indicative of that information in the signaling message. In a particular embodiment, the signaling message may be mapped to a SIP message using a lookup table. The SIP message may be a standardized SIP message or include extensions. For extensions, wireless event information may be extracted from the signaling message during conversion and encapsulated into an extension in the body of a SIP message.

At step 106, the call agent or SIP message, with or without an extension, is forwarded to the call agent 24 for handling. Accordingly, the call agent 24 need not communicate with the MCF 22 using a access network-specific protocol. The call agent 24 may respond to the SIP message and/or generate further control messages to process the SIP message.

FIG. 3 illustrates a method for mobile device registration in accordance with one embodiment of the present invention. Referring to FIG. 3, the method begins at step 120 in which a mobile registration message is received by the call agent 24 from the MCF 22. As previously described, the mobile registration message as well as other messages received by the call agent 24 from the MCF 22 are translated or otherwise converted by the MCF 22 into extended SIP and received by the call agent 24 at an extended SIP interface operable to receive and process standard and extended SIP. At step 122, the mobile device 36 is registered by the call agent 24 in connection with the HLR/VLR 86. Alternatively, the MCF 22 may pass the message to the HLR/VLR 86 through an IS-41 interface.

Step 122 leads to state 124 in which the mobile is registered in the RAN 12. In response to an unregister message, state 124 transitions to step 126 in which the mobile device 36 is unregistered by the call agent 24. Returning to state 124, in response to a cancellation message from the mobile device 36, state 124 transitions again to step 126 in which the mobile device 36 is unregistered. Also at state 124, in response to the expiration of a timer or predefined period of time, state 124 transitions to decisional step 128.

At decisional step 128, if a location update is not received within the predefined period of time, the No branch also leads to step 126 in which the mobile device 36 is unregistered by the call agent 24. If a location update is received within the predefined period of time, the Yes branch of decisional step 128 returns to registered state 124. Thus, absent an unregistration or cancellation message and while location updates are received, mobile device 36 will remain in the registration state 124. When the mobile device 36 unregisters, cancels registration or fails to update its location, as previously described, the mobile device 36 is unregistered.

FIG. 4 illustrates signaling messages for basic call services and mobility management for mobile devices 36 in the RAN 12 in accordance with one embodiment of the present invention. In this embodiment, the RAN 12 communicates with the call agent 24 through the MCF 22 using extended SIP, which is a SIP format or set of messages including one or more SIP extensions.

Referring to FIG. 4, the SIP messages for basic services of mobility management include a mobile registration message 140, a mobile unregisters message 142, a location update request (LUR) message 144 and a registration cancellation message 146. It will be understood that other suitable messages may be used for basic services of mobility management for a wireless access network without departing from the scope of the present invention.

The mobile registration message 140 is an extended SIP message generated by the MCF 22 and forwarded to the call agent 24 for processing. The mobile unregisters message 142 and LUR message 144 are also extended SIP messages generated by the MCF 22 and forwarded for processing by the call agent 24. The registration cancellation message is an extended SIP message generated by the call agent 24 based on a HLR/VLR 86 message for forwarding to the MCF 22 for processing. The SIP extension parameters for basic services and mobility management include the number of the mobile, or ESN, and cell I.D. It will be understood that other suitable extensions may be included with the extended SIP messages without departing from the scope of the present invention.

Figure 5:
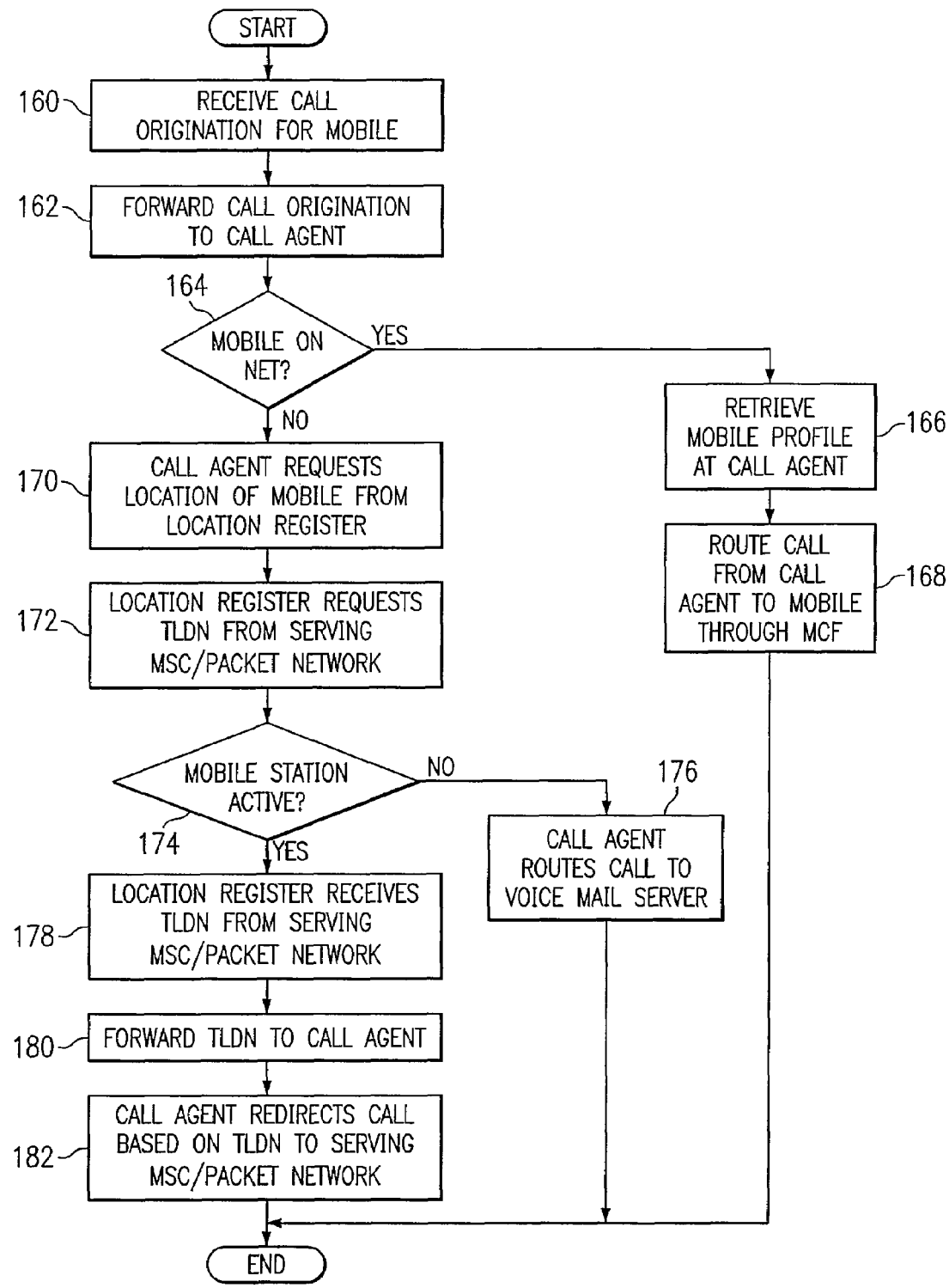
FIG. 5 is a flow diagram illustrating a method for basic call handling for mobile devices in the communication network of FIG. 1 in accordance with one embodiment of the present invention.

FIG. 5 illustrates a method for basic call handling for the RAN 12 in accordance with one embodiment of the present invention. In this embodiment, call handling messages are converted by the MCF 22 to extended SIP and forwarded to the call agent 24 for processing.

Referring to FIG. 5, the method begins at step 160 in which a call origination message is received by the MCF 22 for the mobile device 36. A message is generated for the mobile device 36 when it is generated by the mobile device, for delivery to the mobile device or in connection with a call or event associated with the mobile device. At step 162, the call origination message is forwarded to call agent 24 after translation or other suitable conversion by the MCF 22 to extended SIP format.

Proceeding to decisional step 164, the call agent 24 determines whether the mobile device 36 is on net by accessing the HLR/VLR 86. If the mobile device 36 is on net, the Yes branch of decisional step 164 leads to step 166. At step 166, profile information for the mobile device 36 is retrieved at the call agent 24 from the FS 88 and/or HLR/VLR 86. Next, at step 168, the call is routed from the call agent 24 to the mobile device 36 through the MCF 22. Step 168 leads to the end of the process by which mobile device 36 in the RAN 12 is connected to an incoming call.

Returning to decisional step 164, if the mobile device 36 is not on net, the No branch of decisional step 164 leads to step 170. At step 170, the call agent 24 requests the location of the mobile device 36 from the HLR/VLR 86. Next, at step 172, HLR/VLR 86 requests TLDN from the serving MSC/packet network.

Proceeding to decisional step 174, if the mobile device 36 is not active, the No branch leads to step 176 in which the call agent 24 routes the call to a voicemail server. In one embodiment, the response from the HLR/VLR 86 will include the destination of the voicemail server if the mobile station is not active.

If the mobile station is active, the Yes branch of decisional step 174 leads to step 178 in which the HLR/VLR 86 receives the TLDN from the serving MSC/packet network. At step 180, the TLDN is forwarded to the call agent 24. At step 182, the call agent 24 redirects the call based on the TLDN to the serving MSC/packet network. Step 182 as well as step 176 lead to the end of the process by which an incoming call is connected to the active mobile device 36 or to a voicemail server if the mobile device 36 is not active.

FIG. 6 illustrates messages for basic call handling for the mobile device 36 in the RAN 12 in accordance with one embodiment of the present invention. In this embodiment, the RAN 12 communicates with the call agent 24 through the MCF 22 using extended SIP.

Referring to FIG. 6, the SIP messages for basic call handling include a route request message 200, a response to SIP information message 202 and a TLDN timer expiry message 204. It will be understood that other suitable signaling messages may be used for basic call handling for the RAN 12 or other suitable access network without departing from the scope of the present invention.

The route request message 200 originates with the HLR 86 and is translated by the call agent 24 from the IS-41 format to the extended SIP format and forwarded to the MCF 24 for processing. The response to SIP information message 202 is generated by the MCF 22 in the extended SIP format and forwarded to the call agent 24 for processing. The TLDN timer expiry message is also generated by the MCF 22 and forwarded to the call agent 24 for processing. The TLDN and TLDN timer expiry messages 202 and 204 include TLDN SIP extension parameters.

Figure 7A:
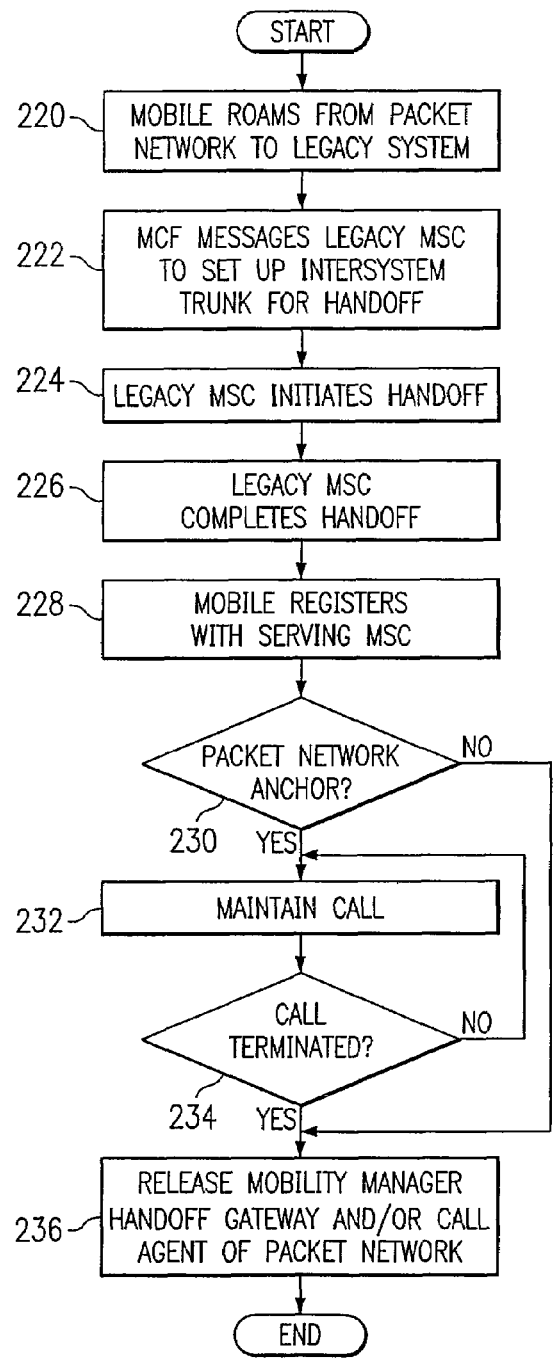
FIGS. 7A-B are flow diagrams illustrating methods for handoffs between legacy systems and patent networks for mobile devices in the communication network of FIG. 1 in accordance with one embodiment of the present invention.
Figure 7B:
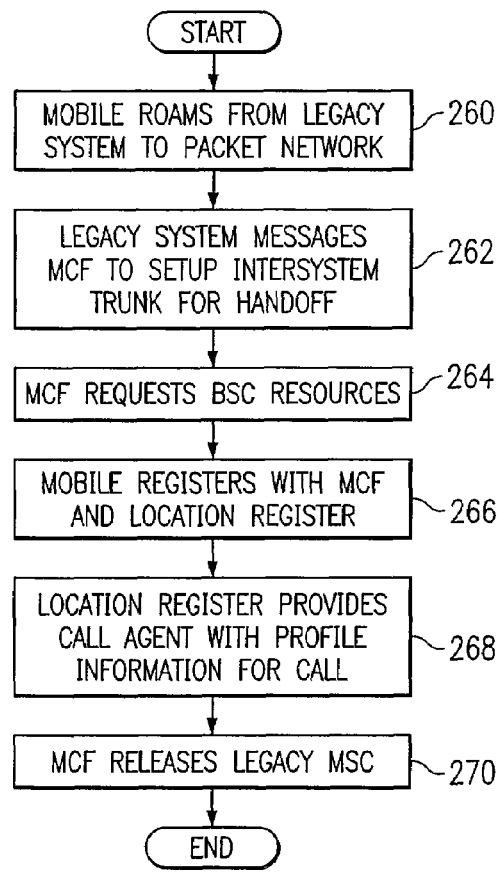

FIG. 7A-B illustrate methods for handoff between the packet network and legacy systems in accordance with one embodiment of the present invention. In particular, FIG. 7A illustrates a method for packet network to legacy system handoff in which the caller remains anchored at the call agent 22 and the bearer path remains anchored to the handoff gateway 58. In addition, the call remains active until facilities released is received by the MCF 22. In other embodiments, the bearer path may be anchored in the PSTN gateway 52 or the wireless-specific access gateway 16. FIG. 7B illustrates a method for legacy system to packet network handoff. In handoffs between the legacy system and the packet network, the MCF 22 receives a message indicative of roaming by the mobile device 36 and processes the handoff in connection with the call agent 24.

Referring to FIG. 7A, packet network to legacy system handoff begins at step 220 in which the mobile device 36 roams from the packet network to the legacy system. Next, at step 222, the MCF 22 messages the legacy MSC to set up an inner system trunk for handoff.

Proceeding to step 242, the legacy MSC 84 initiates handoff. At step 226, the legacy MSC 84 completes handoff. The mobile device 36 registers with the serving MSC at step 228.

Proceeding to decisional step 230, if the packet network is the anchor for the connection, the Yes branch leads to step 232 in which the call is maintained in the packet network. At step 234, as long as the call is not terminated but remains active, the No branch returns to step 232 in which the call is maintained. When the call is terminated, the Yes branch of decisional step 234 leads to step 236 in which the MCF 22 is released as well as the handoff gateway 58 and the call agent 24 of the packet network. Returning to decisional step 230, if the packet network is not the anchor for the connection, the No branch leads to step 236 in which the MCF 22 and the call agent 24 are released. Step 236 leads to the end of the process.

Referring to FIG. 7B, the method for legacy system to packet network handoff begins at step 260 in which the mobile device 36 roams from the legacy system to the packet network. Next, at step 262, the legacy system messages the MCF 22 to set up an inner system trunk for handoff.

Proceeding to step 264, the MCF 22 requests BCS 32 resources. At step 266 the mobile device 36 registers with the MCF 22 and HLR/VLR 86 through the call agent 24.

At step 268, the HLR/VLR 86 provides the call agent 24 with profile information for the call. At step 270, the MCF 24 releases the legacy MSC 84. Step 270 leads to the end of the legacy system to packet network handoff.

Handoff between packet networks are handled by the MCF 22 when between RANs 12, by the call agent 24 when between disparate MCFs 22 and between call agents 24 for handoff across disparate call agents. In each case, the MCF 22 and call agent 24 are kept informed of the point of attachment through SIP information messages. SIP messages may also be used for handoff authorization.

FIGS. 8A-B illustrate messages for handoffs between the packet network and the legacy system in accordance with one embodiment of the present invention. In particular, FIG. 8A illustrates packet network to legacy system handoff messages. FIG. 8B illustrates legacy system to packet network handoff messages.

Referring to FIG. 8A, the packet network to legacy system handoff messages include handoff required message 280, facilities directive response message 282, mobile on channel message 284, registration message 286 and facilities release message 288. The handoff required message 280 is communicated between the MCF 22 and the legacy MSC 84. The facilities directive and mobile on channel messages 282 and 284 are communicated from the legacy MSC to the MCF 22. The registration message 286 is communicated between the call agent 24 and the MCF 22. The facilities release message 288 is communicated between the MCF 22 and the call agent 24.

Referring to FIG. 8B, the legacy system to packet network handoff messages include a facilities directive request message 290, a facilities directive response message 292 and a handoff complete message 294. The facilities directive request message 290 is communicated between the legacy MSC 84 and the MCF 22. The facilities directive response message 292 is communicated from the MCF 22 to the call agent 24. The handoff complete message 294 is communicated from the MCF 22 to the legacy MSC 84. The facilities directive response message 292 includes the ESN and cell I.D. SIP extension parameters.

Figure 9A:
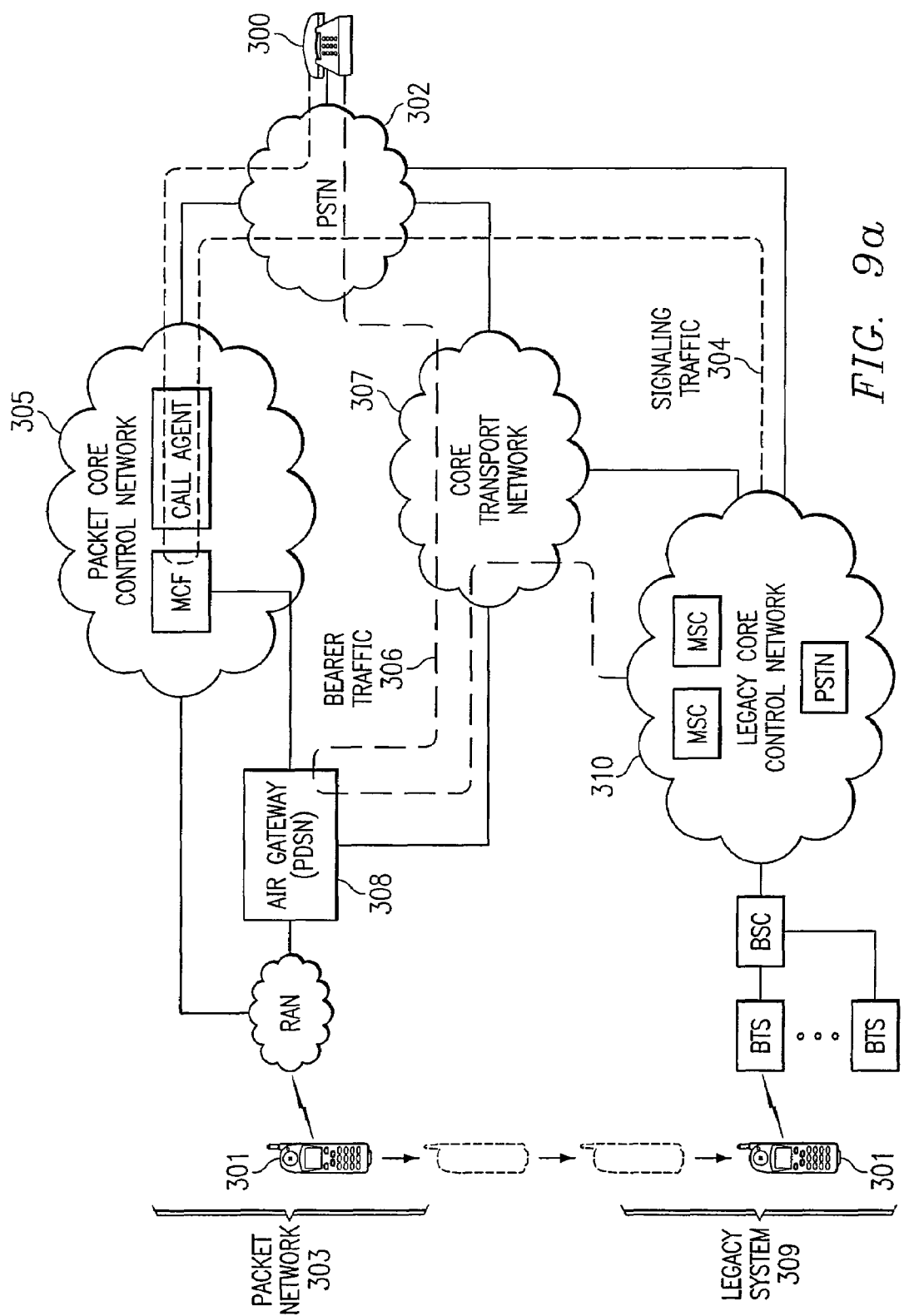
FIGS. 9A-B are block diagrams illustrating connections for mobile device handoff in the packet network and legacy system of FIG. 1 in accordance with one embodiment of the present invention.
Figure 9B:
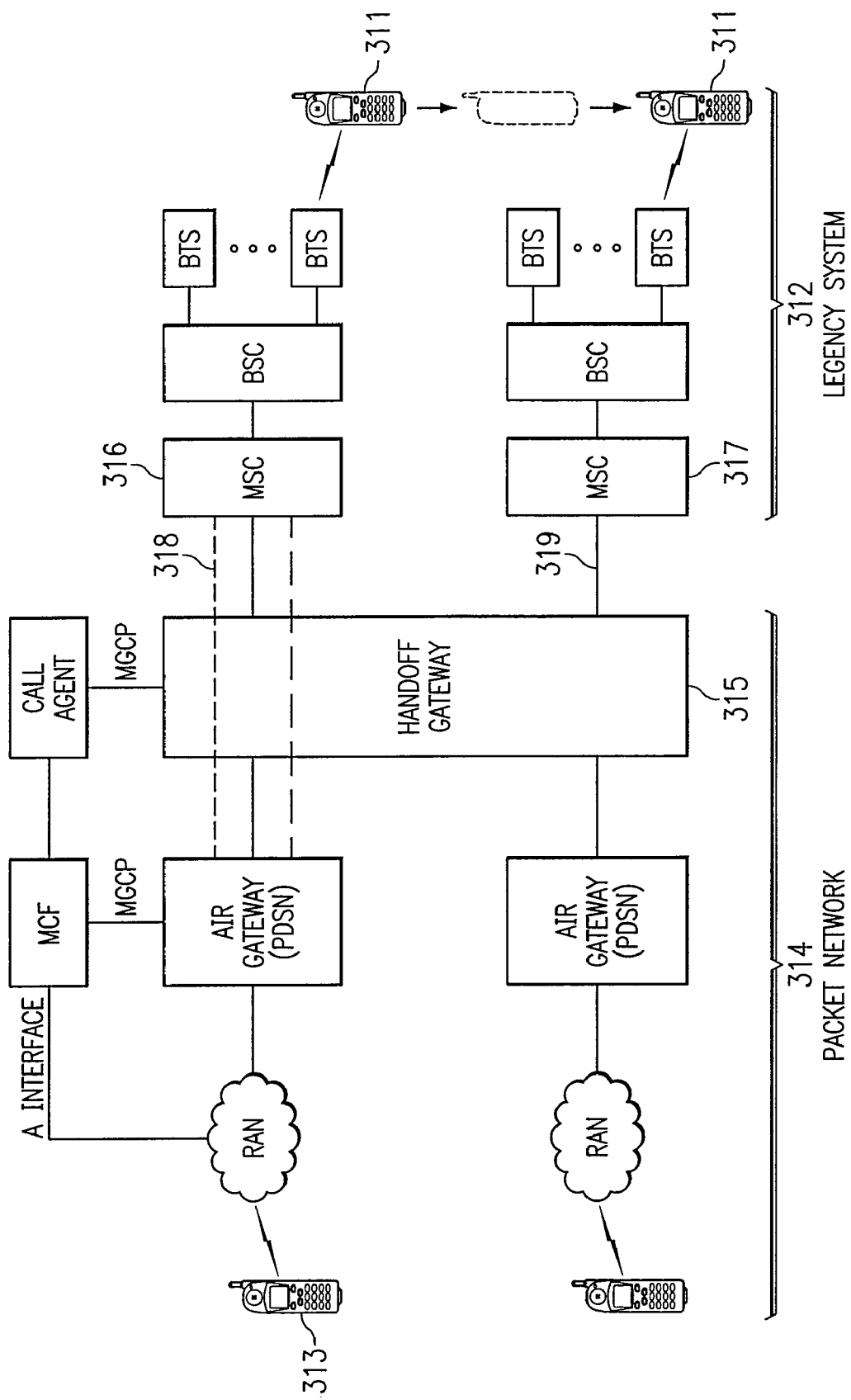

FIGS. 9A-B illustrate connections for mobile device handoff connections in the packet network and/or legacy system in accordance with one embodiment of the present invention. In particular, FIG. 9A illustrates anchoring points for packet network to legacy system handoff. FIG. 9B illustrates anchoring points in a packet network for handoff in the legacy system.

Referring to FIG. 9A, for a connection between a PSTN-based telephone 300 and a mobile device 301 in the packet network 303, signaling traffic 304 is routed through the PSTN 302 to a packet core control network 305 for processing.

Bearer traffic 306 is routed through the PSTN 302 to the core transport network 307 and to the air gateway 308 for delivery to the mobile device 301.

In response to roaming of the mobile device 301 from the packet network 302 to a legacy system 309, signaling traffic 304 remains anchored at the MCF of the packet core control network but is forwarded back through the call agent of the packet core control network 305 and through the PSTN 302 to a legacy core control network 310 for processing. Signaling between the MCF and call agent may be over an extended SIP or other suitable interface. The bearer traffic 306 remains anchored at the air gateway 308 but is routed back through the core transport network 307 to an MSC and the legacy control network 310 for delivery to the mobile device 301.

Referring to FIG. 9B, for a connection between a mobile device 311 in a legacy system 312 and a mobile device 313 in a packet network 314, bearer traffic is forwarded to and from the mobile device 311 through a BTS, BSC and MSC of the legacy network 312 and a handoff gateway 315 of a core transport network. From the handoff gateway 315, bearer traffic is forwarded to an air gateway and RAN of the packet network 314. In response to the mobile device 311 roaming from a first MSC 316 to a second MSC 317 in the legacy system 312, a time division multiplexed (TDM) circuit for the connection is switched from a first TDM circuit 318 between the first MSC 316 and the air gateway of the packet network 314 to a second TDM circuit 319 between the second MSC 317 and the air gateway of the packet network 314. For handoff, the handoff gateway 315 may detect mobile roaming and inform a call agent of the packet core control network which in turn may inform an MCF and the MCF inform the air gateway to switch the TDM circuit. Signaling between the MCF and call agent may be over an extended SIP or other suitable interface.

FIG. 10 illustrates a method for providing supplementary services for wireless calls in accordance with one embodiment of the present invention. In this embodiment, supplementary services are provided by the call agent 24 in connection with the MCF 22 and the PSDN 16.

Referring to FIG. 10, the method begins at step 300 in which a wireless call is set up. Next, at step 302, call triggers for the call and thus the mobile device 36 are retrieved from the FS 88 by the call agent 24. Proceeding to step 304, the wireless-specific triggers are downloaded to the MCF 22 using extended SIP messages. In one embodiment, the service profile/triggers may be received by the MCF 22 during registration/call origination. At step 306, selected wireless-specific triggers are downloaded to the PDSN 16.

Step 306 leads to state 308 in which the PDSN 16 or other node monitors the call for events associated with the selected wireless-specific triggers. In one embodiment, the events may be detected in/at the MCF 22, the PDSN or other element of the air gateway 16 and/or other bearer gateway. In response to a specified wireless event, state 308 transitions to step 310 in which the call agent 24 is notified by the MCF 22 using extended SIP. Next, at step 312, the call agent 24 processes the SIP message in connection with the FS 88 to provide the supplementary service associated with the event.

Step 312 returns to step 308 in which the call is further monitored for the specified events. Upon call termination, state 308 transitions to the end of the process by which supplementary services are provided by the call agent 24 in connection with the MCF 22 for wireless calls.

FIGS. 11A-I illustrate supplementary service messages in accordance with one embodiment of the present invention. In this embodiment, the messages are SIP messages communicated to, from and/or between the MCF 22 and the call agent 24.

Referring to FIG. 11A, SIP feature activation/de-activation messages include a connection management (CM) server request message 320 and a feature request response message 322. The CM service message 320 is generated by the MCF 22 and communicated to the call agent 24 for processing. The feature request response message 322 is generated by the call agent 24 and forwarded to the MCF 22 for processing. The feature request response message 322 includes a confirmation tone or announcement SIP extension parameter.

Referring to FIG. 11B, SIP messages for abbreviated dialing include CM service request message 324. The CM service request message 324 is generated by the MCF 22 and forwarded to the call agent 24 for processing.

Referring to FIG. 11C, SIP messages for calling number identification presentation/restriction (CNIP/CNIR) include a CM service request message 326 and ISUP initial address message (IAM) message 328. The CM service request message 326 is generated by the MCF 22 and forwarded to the call agent 24 for processing. The ISUP IAM message 328 is generated by the call agent 24 and forwarded to the MCF 22 for processing.

Referring to FIG. 11D, SIP messages for call forwarding unconditional (CFU) include infodir message 330 and flash with information acknowledgment message 332. The infodir message 330 is generated by the call agent 24 and forwarded to the MCF 22 for processing. The infodir message 330 includes treatment code SIP extension parameters. As previously discussed, the treatment code parameters may comprise a confirmation tone or announcement. Upon receipt of the infodir message 330, the MCF 22 sends a flash with information to the mobile device 36 with either the signal parameter or the information record causing the mobile to apply abbreviated alert signal. Call agent 24 sends the result of the alerting action to the HLR/VLR 86 and infodir. The call agent 24 may perform CFU when CFU is activated for calls homed in the packet network.

The flash with information acknowledgment message 332 is generated by MCF 22 in response to the infodir message 330 and forwarded to the call agent 24 for processing.

Referring to FIG. 11E, SIP messages for call forwarding no answer (CFNA) include page or answer timeout message 324. The page or timeout message 324 is generated by the MCF 22 and forwarded to the call agent 24. In one embodiment, the call agent 24 will perform CFNA when the MCF 22 responds with the SIP response code of temporarily unavailable. If the mobile device 36 is homed in the packet network, the call agent 24 will perform the call forwarding. If the mobile device 36 is not homed in the packet network, the call agent 24 responds to the originating MSC with a redirect requirement with redirection parameters set to no answer or no response to paging.

Referring to FIG. 11F, SIP messages for call waiting include ISUP IAM message 336, initial flash with information message 338 and subsequent flash with information message 340. ISUP IAM message 336 is generated by the call agent 24 and forwarded to the MCF 22 for processing. The flash with information messages 338 and 340 are generated by the MCF 22 and forwarded to the call agent 24 for processing. The call agent 24 can receive the incoming call from either PSDN or from the legacy MSC or from the packet network. In one embodiment, the call agent 24 determines from the profile of the mobile device 36 that it has the call waiting feature activated and determines from its state that the mobile device 36 is busy. Because the incoming call is routed based on TLDN or the mobile identification number (MIN) the call agent 24 has mapping of the TLDN to MIN number whenever a TLDN is allocated for the call. In this case, an invite request will be generated by the call agent 24 to the MCF 22 for the second call session. The call agent 24 will include service traffic position (STP) information about the bearer in the invite request.

The MCF 22 will start a second call session for a call and send the flash with information message 338 to the mobile station 36 via the BSC 32. If the mobile device 36 accepts the call, the flash with information message 338 is sent to the MCF 22. The MCF 22 sends an answer message and the first call is placed on hold. The MCF may use media gateway control protocol (MGCP) interface to toggle between the two call agent connections. Subsequently, if the mobile device 36 switches from one call to the other by sending a flash with information message, the MCF 22 will place a current call on hold and switch to the original call. The MCF 22 notifies the call agent with SIP info request with flash to toggle between the call agents.

Referring to FIG. 11G, SIP messages for voicemail waiting notification include qualification directive request message 342 and qualification directive response message 344. The qualification directive request message 342 is generated by the call agent 24 and forwarded to the MCF 22 for processing. The qualification directive response 344 is generated by the MCF 24 in response to the request message 342 and forwarded to the call agent 24 for processing. The qualification directive request message 342 includes message wait notification count and message wait notification type SIP extension parameters. Alternatively, subscribe and notify methods may be used for message waiting notification.

Referring to FIG. 11H, SIP messages for voice mail retrieval include service request message 346 and location request response message 348. The service request message 346 is generated by the MCF 22 and forwarded to the call agent 24 for processing. The location request response message 348 is generated by the call agent 24 in response to the request message 346 and returned to the MCF 22 for processing.

Referring to FIG. 11I, SIP messages for calling name presentation and restriction (CNAP and CNAR) include ISUP IAM message 350. ISUP IAM message 350 is generated by the call agent 24 and forwarded to the MCF 22 for processing and includes calling party name SIP extension parameters.

Other supplementary services may comprise location update messages and location specific services. In one embodiment, location specific information is passed in the invite message. This information may be displayed in the called party screen. For example, new services like location identification restriction (LIR) and location identification presentation (LIP) may be implemented. Location specific information may comprise the serving cell site identifier or latitude longitude of the cell site with the FS 88 providing useful location information to mobile user or other party. The location specific information or services during a call may include alerts, advertisements, network congestion information and the like.

Figure 12:
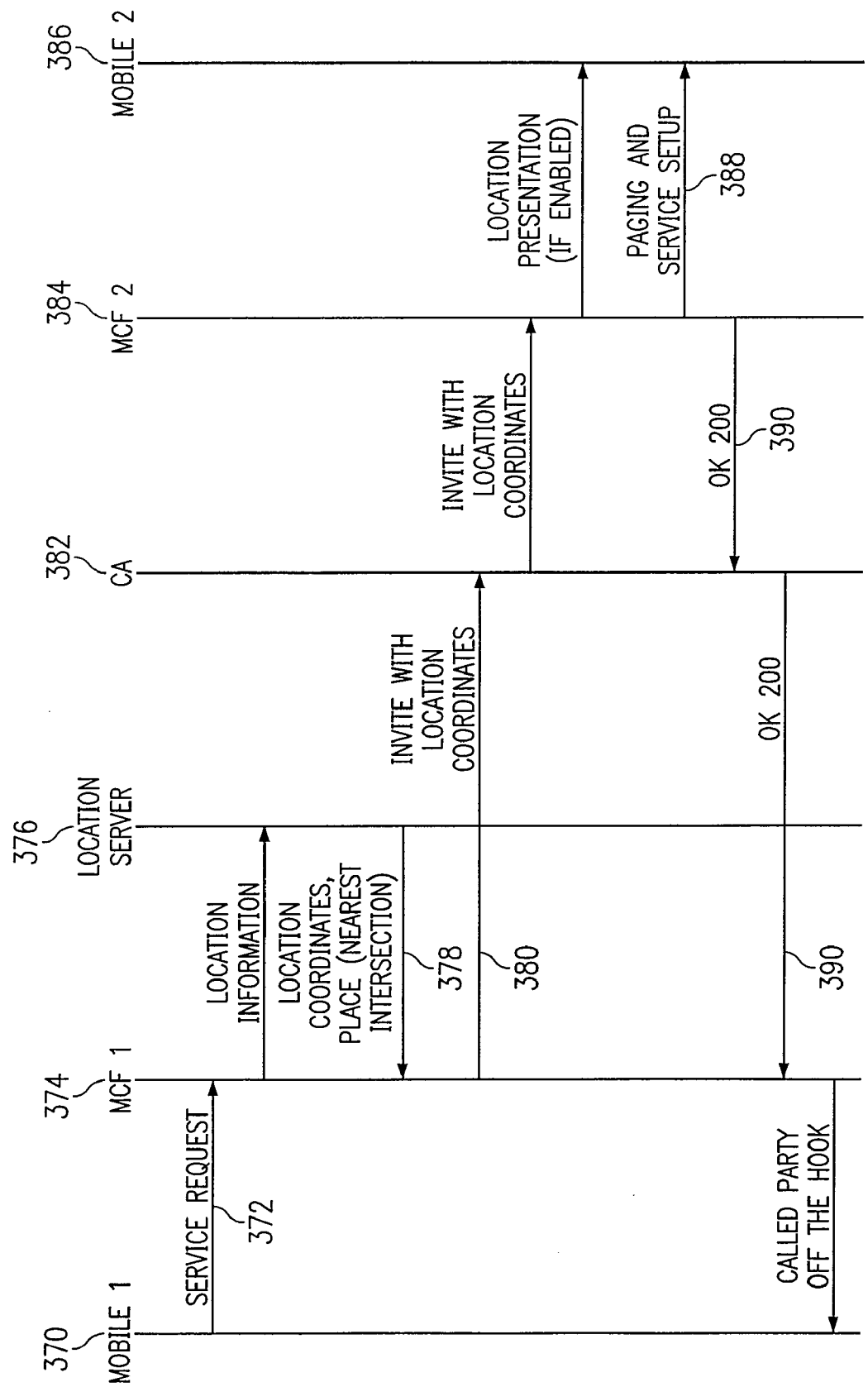
FIG. 12 is a call flow diagram illustrating messages for caller location presentation and restriction services in accordance with one embodiment of the present invention.

FIG. 12 illustrates call flow messages for caller location presentation (CLAP) and caller location restriction (CLAR) services in accordance with one embodiment of the present invention. In this embodiment, the messages between the MCF 22 and the call agent 24 may be passed using extended SIP.

Referring to FIG. 12, a first mobile device 370 initiates a service request 372 which is passed to a first MCF 374 serving the first mobile 370. The MCF 374 forwards location information for the mobile device 370 to a location server 376. The location information may include caller ID, MCF ID and BTS ID. The location server 376 returns location coordinate information 378 to the first MCF 374. The location coordinate information may include identification of a nearest intersection and other readily usable, useful and/or understandable location information.

The first MCF 374 generates an invite message 380 for the service request, including the location coordinates 378. The invite message 380 is passed to a call agent 382.

The call agent 382 forwards the invite message with the location coordinates to a second MCF 384 servicing a second mobile 386 of the connection. The second MCF 384 determines whether CLAP is enabled for the called party and whether CLAR is enabled for the caller. If CLAR is not enabled for the calling party, the second MCF 384 will pass the location coordinates to the second mobile 386 if CLAP is enabled for the called party. If CLAR is enabled for the calling party, the second MCF 384 will not pass the location coordinates to the second mobile 386. Paging and servicing setup messages 388 are also passed from a second MCF 384 to the second mobile 386. Response and/or acknowledgment messages 390 may be passed back from the second MCF to the call agent 382 and from the call agent 382 to the first MCF 374. The MCF 374 may then pass a call party off hook message to the first mobile 370.

Although the present invention has been described with several embodiments, various changes and modifications may be suggested to one skilled in the art. It is intended that the present invention encompass such changes and modifications as fall within the scope of the appended claims and their equivalents.

What is claimed is:

1. A method for processing a wireless-specific trigger, comprising:
   receiving a wireless-specific trigger for a call from a call agent at a mobility control function (MCF) for a wireless access network to provide a wireless-specific service;
   detecting an event associated with the wireless-specific trigger based on wireless-specific signaling of the wireless access network; and
   communicating the event to the call agent through a session initiation protocol (STP) extension.

2. The method of claim 1, wherein receiving a wireless-specific trigger for a call from a call agent comprises downloading the wireless-specific trigger for the call from the call agent at the MCF.

3. The method of claim 1, further comprising receiving the wireless-specific signaling of the wireless access network at the MCF.

4. The method of claim 1, further comprising facilitating processing of the SIP extensions at the call agent to provide an associated wireless-specific service for the call.

5. The method of claim 1, further comprising receiving the wireless-specific trigger from the call agent at the MCF in connection with setup of the call.

6. The method of claim 1, further comprising receiving a notification of a detected event from a bearer traffic gateway.

7. The method of claim 1, wherein the wireless-specific service comprises a supplementary service.

8. A system for processing a wireless-specific trigger, comprising:
   means for receiving a wireless-specific trigger for a call from a call agent at a mobility control function (MCF) for a wireless access network to provide a wireless-specific service;

means for detecting an event associated with the wireless-specific trigger based on wireless-specific signaling of the wireless access network; and means for communicating the event to the call agent through a session initiation protocol (SIP) extension.

9. The system of claim 8, wherein means for receiving a wireless-specific trigger for a call from a call agent comprises means for downloading the wireless-specific trigger for the call from the call agent at the MCF.

10. The system of claim 8, further comprising means for receiving the wireless-specific signaling of the wireless access network at the MCF.

11. The system of claim 8, further comprising means for facilitating processing of the SIP extensions at the call agent to provide an associated wireless-specific service for the call.

12. The system of claim 8, further comprising means for receiving the wireless-specific trigger from the call agent at the MCF in connection with setup of the call.

13. The system of claim 8, further comprising means for receiving a notification of a detected event from a bearer traffic gateway.

14. The system of claim 8, wherein the wireless-specific service comprises a supplementary service.

15. Software for processing a wireless-specific trigger, the software embodied in a computer readable medium and operable to:

receive a wireless-specific trigger for a call from a call agent at a mobility control function (MCF) for a wireless access network to provide a wireless-specific service;

detect an event associated with the wireless-specific trigger based on wireless-specific signaling of the wireless access network; and communicate the event to the call agent through a session initiation protocol (SIP) extension.

16. The software of claim 15, wherein receiving a wireless-specific trigger for a call from a call agent comprises downloading the wireless-specific trigger for the call from the call agent at the MCF.

17. The software of claim 15, the software further operable to receive the wireless-specific signaling of the wireless access network at the MCF.

18. The software of claim 15, the software further operable to facilitate processing of the SIP extensions at the call agent to provide an associated wireless-specific service for the call.

19. The software of claim 15, the software further operable to receive the wireless-specific trigger from the call agent at the MCF in connection with setup of the call.

20. The software of claim 15, the software further operable to receive a notification of a detected event from a bearer traffic gateway.

21. The software of claim 15, wherein the wireless-specific service comprises a supplementary service.

22. A method for processing a wireless-specific trigger, comprising:

receiving a wireless-specific trigger for a call from a call agent at a bearer traffic gateway to provide a wireless-specific service;

detecting an event associated with the wireless-specific trigger at the bearer traffic gateway;

notifying a mobility function control (MCF) of the event; and communicating the event from the bearer traffic gateway to the call agent through a session initiation protocol (SIP) extension.

23. The method of claim 22, wherein receiving a wireless-specific trigger for the call from the call agent comprises downloading the wireless-specific trigger for the call from the call agent at the bearer traffic gateway.

24. The method of claim 22, wherein notifying the MCF of the event comprises forwarding the event to the MCF.

25. The method of claim 22, further comprising facilitating processing of the event by the MCF.

26. The method of claim 22, further comprising facilitating processing of the SIP extension at the call agent to provide an associated wireless-specific service for the call.

27. The method of claim 22, wherein the wireless-specific service comprises a supplementary service.

* * * * *